United States Patent [19]

Entrekin et al.

[11] Patent Number: 5,305,756
[45] Date of Patent: Apr. 26, 1994

[54] VOLUMETRIC ULTRASONIC IMAGING WITH DIVERGING ELEVATIONAL ULTRASOUND BEAMS

[75] Inventors: Robert R. Entrekin, Bothell; Brent S. Robinson, Kirkland; Philip Keller, Indianola, all of Wash.

[73] Assignee: Advanced Technology Laboratories, Inc., Bothell, Wash.

[21] Appl. No.: 43,045

[22] Filed: Apr. 5, 1993

[51] Int. Cl.$^5$ .............................................. A61B 8/00
[52] U.S. Cl. ........................ 128/660.09; 128/661.01; 128/662.03; 128/663.01
[58] Field of Search ...................... 128/661.01, 662.03, 128/916; 73/625–626, 642, 644

[56] References Cited

U.S. PATENT DOCUMENTS

| | | | |
|---|---|---|---|
| 4,184,094 | 1/1980 | Kopel | 128/662.03 X R |
| 4,445,915 | 8/1990 | Nagasaki | 128/661.01 X R |
| 4,459,853 | 7/1984 | Miwa et al. | 128/661.01 X R |

OTHER PUBLICATIONS

Talbert, D. G. "An Add-on Modification for Linear Array Real Time Ultrasound Scanners to Produce 3 Dimensional Displays", UTS International 1977 Brighton, England (Jun. 28–30, 1977) pp. 57–67.
D. H. Howry et al., "Three dimensional and stereoscopic observation of body structures by ultrasound", J. Appl. Phys., v. 9, pp. 304–306 (1956).
O. T. von Ramm et al., "High-speed ultrasound volumetric imaging system-Part II: parallel processing and display," IEEE Trans. Ultrason. Ferroelec. Frequ. Contr., vol. 38, pp. 109–115 (1991).
S. W. Smith et al., "High-speed ultrasound volumetric imaging system-Part I: Transducer design and beam steering," IEEE Trans. Ultrason. Ferroelec. Freq. Contr., vol. 38, pp. 100–108 (1991).
D. P. Shattuck et al., "Explosocan: A parallel processing technique for high speed ultrasound imaging with linear phased arrays," J. Acoust. Soc. Amer., vol. 75, No. 4, pp. 1273–1282 (1984).

Primary Examiner—Francis Jaworski
Attorney, Agent, or Firm—W. Brinton Yorks, Jr.

[57] ABSTRACT

An ultrasonic transducer is provided for producing two-dimensional projection images of the interior of the body. The transducer may comprise an array of elements, acuated to produce scanning beams which are focused in the azimuthal direction and divergent in the elevation direction. The elements will, when actuated, emit fan-shaped beams which will insonify a volumetric region in front of the transducer. Echoes returning from structures within the volumetric region are acoustically integrated and projected onto a plane within the region. An image display of this plane will represent a two-dimensional projection of the volumetric region.

10 Claims, 3 Drawing Sheets

VOLUMETRIC ULTRASONIC IMAGING WITH DIVERGING ELEVATIONAL ULTRASOUND BEAMS

This invention relates to the use of ultrasonic diagnostic imaging systems for the production of volumetric, projection images of the interior of the body and, in particular, to the use of ultrasound beams for volumetric imaging which diverge in the elevational direction to produce a "fan beam" in that direction.

Various noninvasive diagnostic imaging modalities are capable of producing cross-sectional images of organs or vessels inside the body. An imaging modality which is well suited for such real-time noninvasive imaging is ultrasound. Ultrasonic diagnostic imaging systems are in widespread use for performing ultrasonic imaging and measurements through the use of scanheads which are placed against the skin. Such systems are in common use by cardiologists, obstetricians, and radiologists for examinations of the heart, a developing fetus, or internal abdominal organs. These systems operate by transmitting waves of ultrasonic energy into the body, receiving echoes returned from tissue interfaces upon which the waves impinge, and translating the received echo information into structural representations of the planar "slice" of the body through which the ultrasonic waves are directed.

In order to create a two-dimensional image of an interior planar slice of the body it is necessary to scan or steer an ultrasonic beam over the area to be imaged. This is done by either mechanically or electronically scanning the beam so as to receive echoes from the two dimensional area. One of the dimensions, referred to herein as the azimuth direction, is the longitudinal dimension of an array transducer or the motional direction of a mechanically scanned transducer. The second dimension in the two-dimensional plane is the depth into the body to which the ultrasonic beam is transmitted and from which echoes return.

In conventional ultrasonic imaging it is generally desirable to minimize the thickness of the planar slice which is scanned. A thin slice will provide the least amount of clutter in the planar image. The conventional way to provide the thinnest slice is to collimate the ultrasound beam in the elevational direction, the width dimension of the transducer which is normal to the azimuth direction. An annular array transducer will provide a highly collimated beam and hence a thin image slice, for instance. Linear array transducers may be collimated in the elevational direction by techniques such as fabricating the transducer elements with a concave curvature in the elevational direction or using a lens across each element to collimate the beam in the elevational direction.

While two-dimensional real-time imaging is now commonplace in ultrasonic diagnostic imaging, there remains a long-felt need to produce three-dimensional images of the interior of the body ultrasonically. See, e.g., D. H. Howry, G. J. Posokony, C. R. Cushman and J. H. Homes, "Three-dimensional and stereoscopic observation of body structures by ultrasound," *J. Appl. Physiol.*, vol. 9, pp. 304–06 (1956). Three-dimensional real-time imaging poses two major tasks for developers: acquiring echo data from a volume of the body in a sufficiently short time to maintain a real-time image frame rate, e.g., thirty images per second, and reducing this volumetric data to a suitable two-dimensional image format for display. The latter task is continually aided by ever-increasing speeds of computer processing and advancing image processing techniques. The former task remains formidable due to the necessity to scan or sweep the ultrasound beam in the third dimension. Conceptually, a plurality of parallel, planar slices of the body must be scanned in order to gather a complete volumetric data set. Scanning of the third dimension may be achieved by oscillating a mechanically scanned transducer in two directions instead of one, or by electronically steering an ultrasonic beam from a two-dimensional array transducer. See, e.g., O. T. von Ramm, S. W. Smith and H. G. Pavy, Jr., "High-speed ultrasound volumetric imaging system - Part II: parallel processing and display," IEEE Trans. Ultrason. Ferroelec. Freq. Contr., Mar., 1991 at 109–15. In either case, the need for a real-time image frame rate is consistently opposed by the laws of physics, which dictate the maximum speed of ultrasound through tissue. The severity of these obstacles have kept three-dimensional ultrasonic imaging beyond the reach of widespread commercial ultrasonic imaging systems.

In accordance with the principles of the present invention, real-time ultrasonic images are provided through a transducer which utilizes conventional focusing of the ultrasonic beam in the azimuth direction and a divergent beam in the elevation direction. This is contrary to the conventional wisdom, which specifies a highly collimated beam in the elevation direction. The divergent elevational beam, which is achieved through the geometry of the transducer, a lens system, or a combination of the two, produces a fan-shaped beam in the elevation direction. The fan beam effectively integrates echoes in the third, elevation direction to project the volumetric information into a single two-dimensional projection image. Through use of the fan beam the inherent image frame rate is not adversely affected, and the echo data may be processed for display by conventional methods, using standard two dimensional techniques of beamforming and scan conversion. The resulting image display is a striking two-dimensional projection image of the volume scanned by the fan beam.

Figure 1:
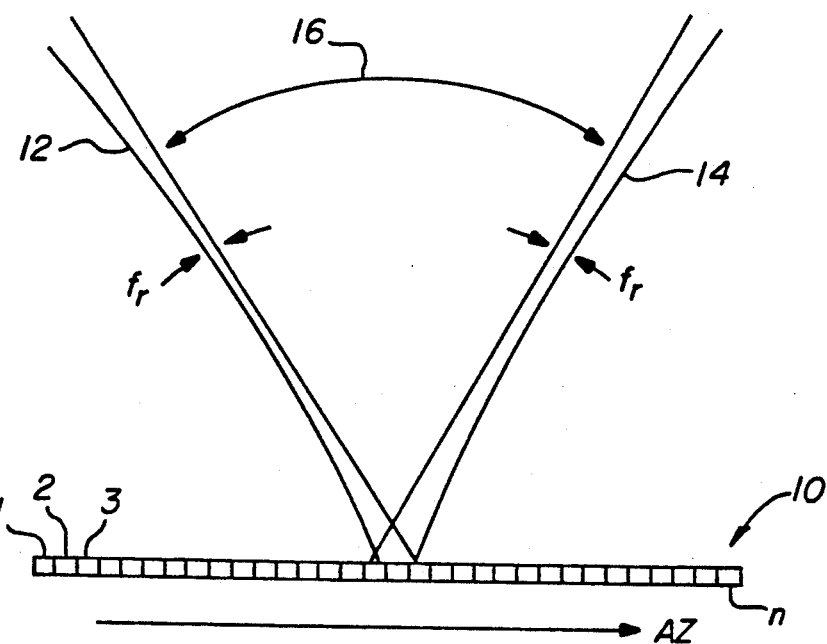
FIG. 1 illustrates an ultrasonic transducer array which is electronically steering a focused acoustic beam.

Referring to FIG. 1, an n-element array 10 of ultrasonic transducer elements is shown. The elements in the array are numbered 1, 2, 3, . . . n. The n-element array 10 is operated in the conventional manner known as phased array operation, whereby the carefully staggered timing of actuation of individual elements in the array develop an ultrasonic beam which is directed or steered in various directions in front of the array. In the illustration of FIG. 1 the beam is steered over the duration of sequential transmissions over a triangular area in front of the array as indicated by sweep arrow 16, the lateral extremes of which are denoted by beam profiles 12 and 14. The direction parallel to the area which is scanned or swept by the ultrasonic beam is referred to as the azimuth direction as indicated by the AZ arrow below the transducer array. As is conventionally done, the beam profile is narrowed about a beam focal point or around a focal range indicated as $f_r$ in FIG. 1. As is well known, the focusing of the beam around the focal point or range is accomplished by the timing of actuation of the individual elements of the array in the formation of a beam. As FIG. 1 shows, an ultrasonic beam is normally focused in the azimuth direction as it scans the azimuthal plane.

Figure 2A:
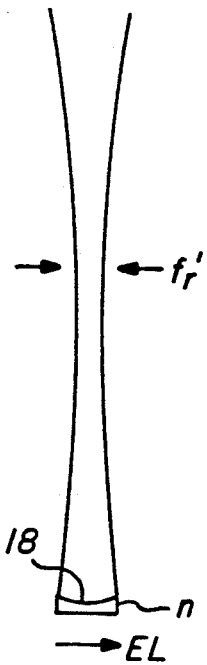
FIGS. 2a and 2b illustrate a comparison of conventional elevation focusing with an elevational fan-shaped beam in accordance with the present invention.

FIG. 2a shows the transducer array 10 of FIG. 1 in a view toward the side of the array, the elevation direction. In elevation, each of the n elements of the array is each seen to be focused in the elevation direction at a range $f_r'$. This is normally done because of the desire to insonify the thinnest possible plane, thereby producing an ultrasonic image of a thin "slice" of the person or object being scanned. Elevation focusing may be accomplished by the chosen geometric surface 18 of the n transducer elements which is shown to be concave in FIG. 2a. Alternatively, acoustic lenses may be used to accomplish elevational focusing of the acoustic beam produced by the transducer elements.

Figure 2B:
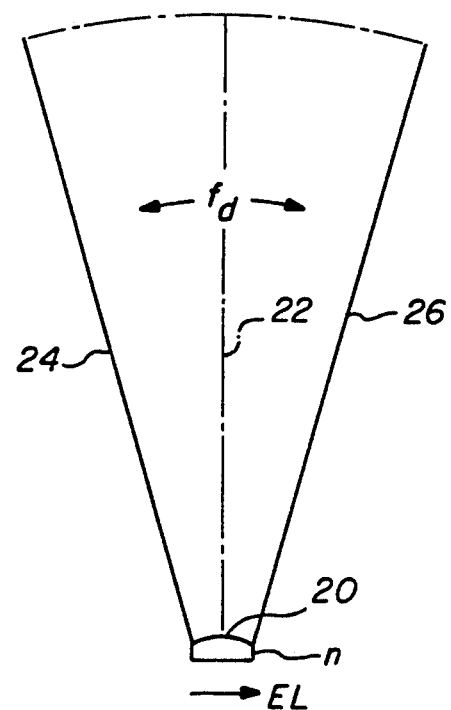

FIG. 2b illustrates the production of a fan-shaped beam in the elevation direction in accordance with the principles of the present invention. Unlike the conventional beam of FIG. 2a, the ultrasonic beam of FIG. 2b is divergent as shown by profile boundaries 24, 26. The beam does not converge about a focal point or range, but is continually divergent in the elevation direction EL as indicated by arrow $f_d$. The fan-shaped beam is seen to be divergent about a central axis 22 which as will be discussed is in the plane of the ultrasonic image produced by the transducer array.

The fan-shaped beam is produced by making the emitting surface of the transducer elements acoustically divergent. This is accomplished for instance by giving the emitting surface of each of the n transducer elements a convex shape 20 in the elevation direction. A combination of the geometry of the transducer and that of an associated acoustic lens may also provide acoustic divergence in the elevation direction as will be shown in FIG. 4. Alternatively, a series of transducer elements in the elevation direction may be sequentially actuated to electronically produce a fan-shaped beam in the elevation direction.

Figure 3:
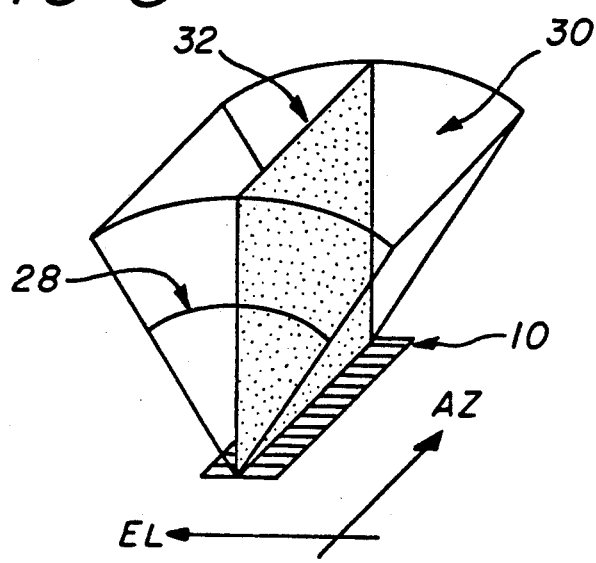
FIG. 3 illustrates an ultrasonic transducer array which is designed to produce a fan-shaped beam in accordance with the principles of the present invention.

A preferred embodiment of the present invention is shown in FIG. 3. In this embodiment each transmitted acoustic beam is focused in the azimuthal direction AZ and divergent (fan-shaped) in the elevation direction EL. In this embodiment the transducer array 10 is scanned in a linear array format whereby sequential insonifications transmit fan-shaped beams orthogonal to the longitudinal surface of the array 10. The assembly of fan-shaped beams thereby insonifies a volumetric region 30. In the center of the insonified volume 30 is a plane of projection 32 which is coincident with the axes 22 of the fan-shaped beams (see FIG. 2b). The plane of projection 32 is spatially represented by the ultrasonic image produced by the transducer array 10 and is a plane which typically is that which is normal to the surface of the transducer array 10 in the azimuthal direction. The ultrasonic image appears three-dimensional because the transducer array 10 acoustically integrates all echoes at each range across the entire volumetric region, thereby projecting or collapsing echoes throughout the volumetric region 30 onto the plane of projection 32. Since the fan-shaped beams diverge radially in the elevation direction plane, each constant range locus is a radial line as indicated by constant range locus 28. Each echo along constant range locus 28 is projected to the point of intersection of the locus 28 and the plane of projection 32. Since this projection occurs at every range and azimuthal location throughout the volumetric region 30, the image of the plane of projection 32 presents a two-dimensional projection of the entire volume.

Figure 4:
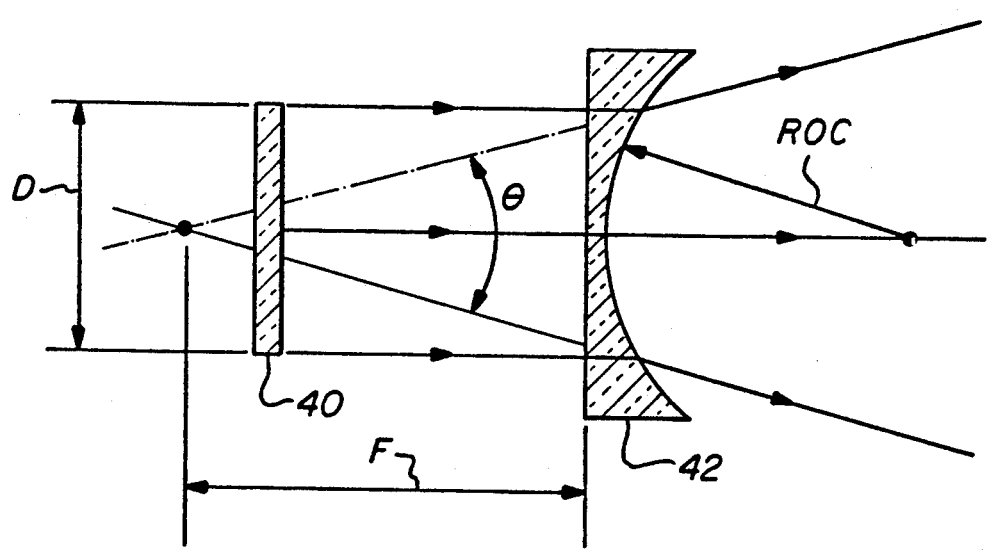
FIG. 4 illustrates a technique for producing a fan-shaped beam in accordance with the present invention by use of an acoustic lens.

Since the transmitted beams are fan-shaped in the elevation direction but remain focused in the azimuthal direction, the two-dimensional projection continues to exhibit the precision of lateral (azimuthal) resolution that would be exhibited by scanning with a conventional linear array transducer and imaging system. The projectional images of the present invention may advantageously be produced by utilization of conventional beamforming techniques for array transducers as well as conventional scan conversion and image processing techniques.

while the array 10 and azimuthal direction are shown to be linear in FIG. 3, it should be understood that the technique is equally applicable to a curved array transducer, in which the array 10 is curved in an arc in the azimuthal direction.

one technique for creating a fan-shaped beam in the elevation direction is illustrated in FIG. 4, which employs an array of piezoelectric elements 40 in combination with an acoustic lens made of RTV silicone rubber. In FIG. 4, the transducer array 40 and the planoconcave cylindrical lens 42 are shown in end view. The lens 42 is generally in direct contact with the transducer array 40, but is shown separated in the view of FIG. 4 for clarity of illustration. The concave surface of the lens exhibits a radius of curvature ROC that produces a virtual focus of focal length F. The transducer elements have a length in the elevation direction of D. For a desired angle of divergence $\theta$ the trigonometric expression for the angle of divergence is $$tan(\theta/2) = D/(2F); \text{ therefore } F = D/\{2 \ tan(\theta/2/2)\}$$

To find the radius of curvature ROC for the desired divergence angle $\theta$ the foregoing relationship yields $$1/F = (n-1)\{1/ROC\}$$

where n is the index of refraction, calculated as the speed of sound through the body being examined divided by the speed of sound through the lens material. A conventional RTV silicone rubber formulation such General Electric RTV 630 or 615 exhibits a speed of transmission of approximately 1000 m/sec. Human tissue exhibits a speed of sound of approximately 1540 m/sec. Thus, for instance, if a divergence angle of 45° is desired for a transducer array with D=0.4374 in., solving for F shows that F =0.53 in. Then solving for the radius of curvature results in $$ROC = (1.54 - 1)F = F/1.85$$

Such a cylindrical lens can be fabricated by pouring degassed RTV silicone rubber compound into a flat bottomed mold of a width and length appropriate to the dimensions of the transducer array, and forming the concave surface with an aluminum rod with a radius of curvature of 0.286 inches.

The concavity of this lens can inhibit the ability to make good acoustic contact with a patient, as air, which has a low transmissivity to ultrasound, can occupy the concave space at the front of the lens. A solution to this dilemma is to fill the concave space with a filler material of the appropriate acoustic impedance and speed. The appropriate acoustic impedance and speed are those that closely match that of the body. The Hexcel Corp. of Chatsworth, Calif. produces a number of filler materials with an acoustic speed of approximately 1580 m/sec., close to that of the human body. Using a filler material with a speed approximating that of human tissue will not affect the focusing characteristics of the transducer-lens combination. But if a filler is used with a speed of sound which does not match that of the subject the combined focusing effects of the transducer, lens and filler must be determined to establish the composite dispersion resulting from the combination. These effects can be determined by $$1/F = (n_{filler} - 1) \, 1/ROC_{filler} + (n_{lens} - 1) \, 1/ROC_{lens}$$

for a filler with a surface that is planar with the body. This calculation, coupled with the length dimension of the transducer array and the range of sensitivity of the transducer will enable the user to determine the size of the insonified volume which will be shown in the resulting ultrasonic image.

Figure 5:
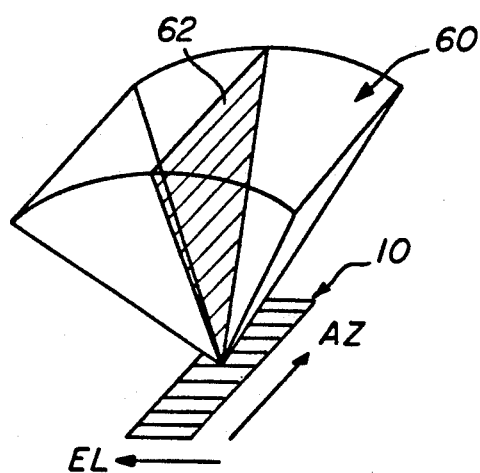
FIG. 5 illustrates the production of a fan-shaped beam in accordance with the present invention by use of an electronically scanned transducer.

While a linear array embodiment of the present invention is shown in FIG. 3, the invention may also be used with phased array transducer operation as well as mechanically scanned transducers. Referring to FIG. 5, a linear array 10 of transducer elements is shown, the elements being selectively actuated to electronically steer and focus the transmitted ultrasonic beams in the manner described in FIG. 1. The surface geometry or lenses of the array elements, formed as described above, together with electronic azimuthal focusing, give the beams emitted by the array the characteristics of convergence in the azimuthal direction and divergence in the elevation direction, i.e., fan-shaped beams. The electronic steering of these beams enable the insonification of a pyramidal shaped volume 60 in front of the transducer. Echoes within this volumetric region 60 are projected onto the triangular shaped plane of projection 62, and these projections are displayed as a three-dimensional ultrasonic image.

Figure 6:
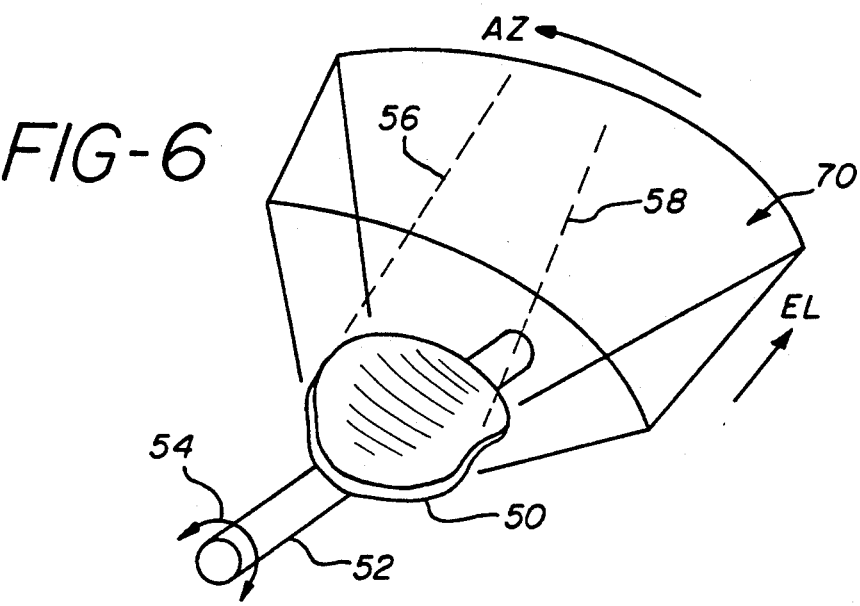
FIG. 6 illustrates the production of a fan-shaped beam in accordance with the present invention by use of a mechanically scanned transducer.

FIG. 6 illustrates a single piston or annular array transducer 50 with a surface geometry that will result in convergence in the azimuthal direction and divergence in the elevation direction. The emitting surface of the transducer 50 is approximately saddle-shaped, causing divergence in the elevational direction of the axis of shaft 52 and convergence in the azimuthal direction. This convergence is illustrated by lines 56, 58 which are drawn orthogonal to the edge surfaces of the opposing sides of the transducer 50 in the azimuthal plane. The transducer is oscillated back and forth to scan the volumetric region in front of the transducer through oscillation of the shaft 52 to which it is attached. The oscillatory motion is indicated by the arrow 54. As it moves the transducer 50 will insonify the volumetric region 70 in front of the transducer. Since the transducer beam profile is focused in the azimuthal direction and divergent in the elevational direction by virtue of the transducer surface geometry, the resulting image will exhibit three-dimensional projection of echoes in the volumetric region 70 with good lateral resolution. Of course the same result may be obtained with a planar surface transducer in combination with an appropriate acoustic lens.

Figure 7:
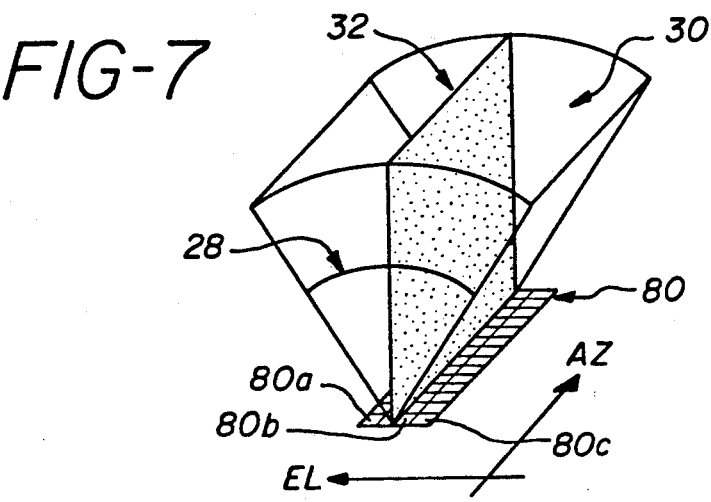
FIG. 7 illustrates the electronic production of a fan-shaped beam in the elevation direction.

FIG. 7 illustrates the electronic production of a fan-shaped beam in the elevational direction. In FIG. 7 the transducer 80 is a two-dimensional array of elements. Like the embodiment of FIG. 3, there is a series of elements aligned in the azimuthal direction. In addition, each element in the azimuthal direction is sub-diced in the elevational direction. Three of these sub-elements $80a$, $80b$, and $80c$ are shown in FIG. 7. The plurality of elements in the elevational direction allows electronic generation of the fan-shaped beam, as contrasted with the earlier discuss-ad techniques which rely upon lenses or the geometry of the element surface. In this embodiment the times of actuation of the sub-elements control beam divergence in the elevational direction. For example, in FIG. 7 sub-element $80b$ would be actuated first, followed in rapid succession by sub-elements $80a$ and $80c$ in order to produce a beam which is divergent in the elevational direction. Thus, electronic control of the actuation times of the elevational sub-elements will in turn control the generation of the fan-shaped beam.

Yet another alternative technique for generating the fan-shaped beam in the elevation direction is to utilize a transmitting aperture in the form of a slit, which has its length dimension in the azimuth direction and is very narrow in the elevation direction. This technique utilizes diffraction to radiate an essentially cylindrical beam to develop the desired divergence in the elevation direction. In the embodiment of FIG. 7, this technique could be achieved by making the central row of sub-elements very narrow in the elevation direction.

Experiments with constructed embodiments of the present invention have shown that image clarity can be obscured if a significant number of acoustic scatterers are present in the volumetric region next to an object which is to be interrogated. This is an expected phenomenon, as echoes from such scatterers will be commonly projected onto the plane of projection along with desired echoes, the former manifesting themselves as clutter in the image. This clutter is caused by scatterers at the same range and azimuth, but different elevation. Hence the present invention will find its most useful applications where a homogeneous or low scattering medium surrounds the internal structure being interrogated. Such an application would be a fetus in amniotic fluid or the retina of the eye, in front of which is located the uniform medium of vitreous humor.

What is claimed is:

1. In an ultrasonic imaging system, including transducer means having an ultrasonic energy emitting surface for scanning a region in front of said emitting surface in an azimuthal direction by mechanically sweeping beams emitted from said transducer means over said region, and means for producing an image from echoes received by said transducer means, said transducer means further comprising means for focusing the ultrasonic energy emitted by said transducer means in the azimuthal direction at a focal range in front of said emitting surface and means for diverging said ultrasonic energy in the elevation direction within said azimuthal focal range.

2. In the ultrasonic imaging system of claim 1, wherein said transducer means further comprises a single piston or annular array transducer, the beams from which are mechanically swept in an oscillatory motion.

3. In the ultrasonic imaging system of claim 2, wherein said means for diverging comprises the surface geometry of the transducer means in the elevation direction.

4. In the ultrasonic imaging system of claim 3, wherein said transducer means comprises means for emitting a sequence of fan-shaped beams, each of which is focused in the azimuthal direction and divergent in the elevation direction, said sequence of fan-shaped beams insonifying a volumetric region in front of said emitting surface for the production of echoes from said region.

5. In the ultrasonic imaging system of claim 4, wherein said means for producing an image comprises means for forming an image representing an image plane which is parallel to said azimuthal direction of said transducer means.

6. In the ultrasonic imaging system of claim 1, wherein said means for focusing and said means for diverging comprise the surface geometry of said transducer means.

7. In the ultrasonic imaging system of claim 6, wherein the surface geometry of said transducer means is approximately saddle shaped.

8. In the ultrasonic imaging system of claim 7, wherein said transducer means includes a transducer element having a saddle shaped surface.

9. In the ultrasonic imaging system of claim 6, wherein said transducer means includes a transducer element, and wherein the surface geometry of said transducer means is a combination of the surface geometry of said transducer element and an acoustic lens.

10. In an ultrasonic imaging system, including transducer means having an ultrasonic energy emitting surface for scanning a region in front of said emitting surface in an azimuthal direction, and means for producing an image from echoes received by said transducer means, said transducer means further comprising a two dimensional array of elements oriented in the azimuthal direction and in the elevation direction, means for focusing the ultrasonic energy emitted by said transducer means in the azimuthal direction and means for diverging said ultrasonic energy in the elevation direction, wherein said means for focusing and said means for diverging control the timing of actuation of respective elements of said array.

* * * * *